July 20, 1937
H. D. OAKLEY
2,087,652
RESONANCE INDICATOR
Filed Oct. 16, 1935
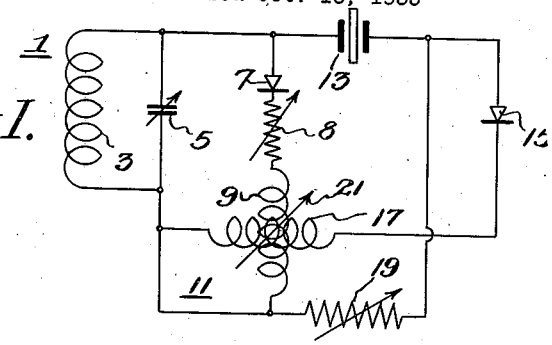
Fig. I.
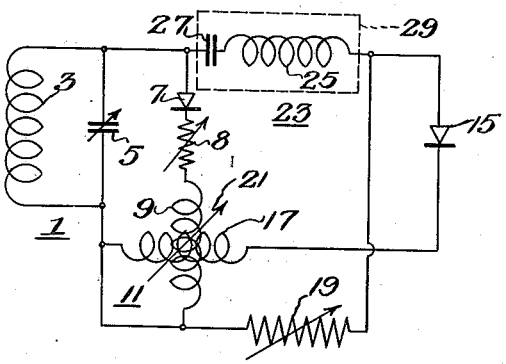
Fig. II.
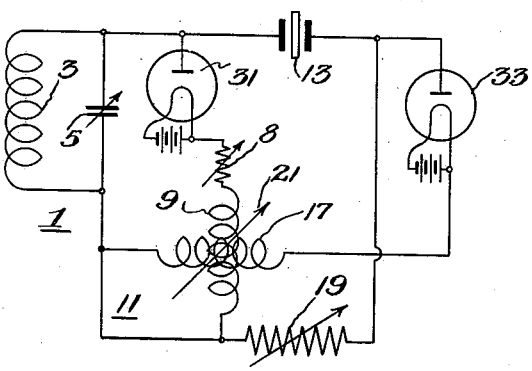
Fig. III.
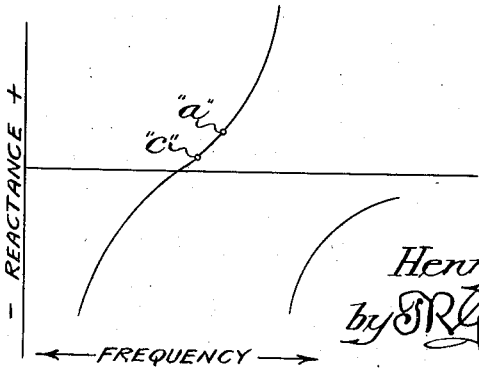
Fig. IV.
Witnesses:
CD Puska
George C. Jepson
Inventor
Henry D. Oakley
by T. R. Goldsborough
Attorney.

Patented July 20, 1937

2,087,652

UNITED STATES PATENT OFFICE 2,087,652

RESONANCE INDICATOR

Henry D. Oakley, Woodlynne, N. J., assignor to Radio Corporation of America, a corporation of Delaware Application October 16, 1935, Serial No. 45,217

7 Claims. (Cl. 250—39)

My invention relates broadly to frequency indicators. More specifically my invention is an indicator which indicates directly small departures of a radio generator from its assigned frequency.

Gradually increasing use of the radio frequency spectrum has so crowded the available channels that it is essential for transmitting stations to very closely maintain their assigned frequency. In the case of broadcasting radio stations, the United States Government requires that the transmitters maintain their assigned frequency to within fifty cycles.

Regulation of the transmitters is accomplished by frequency monitoring devices which are under the observation of the station operators. Such devices have been complicated, expensive, and not entirely satisfactory. I propose to overcome these difficulties and provide a simple direct reading frequency indicator.

One of the objects of my invention is to provide means for directly indicating frequency conditions.

Another object is to indicate small departures from an assigned frequency with a simplified circuit arrangement.

A still further object is to employ means, including a piezo electric element, for indicating minute departures from a predetermined frequency.

Additional objects will be apparent from the following specification and appended claims.

An understanding of my invention may be best had by reference to the accompanying drawing and specification.

Figure 1 is a schematic diagram indicating a preferred embodiment of my invention, Fig. 2 is a diagram of one modification of my invention, Fig. 3 is an embodiment of my invention employing thermionic rectifiers, and Fig. 4 is an illustration showing the reactance curve of a piezo-electric crystal.

In the several diagrams similar parts are represented by similar reference numerals. The indicating meter which will be described later has iron cores and magnetic fields which are not illustrated but are well known to those skilled in the art.

A resonant circuit 1 comprising an inductor 3 and a variable capacitor 5 is connected to a rectifier 7, a series resistance 8, and the armature winding 9 of an indicating meter 11. The winding and rectifier are serially connected. The terminal of the rectifier, remote from the armature winding, is connected to one terminal of a piezo-electric element 13. The remaining terminal of the piezo-electric element is connected to a second rectifier 15, which is in turn connected to a second winding 17 of the indicating meter. The first and second armature windings are joined together and to the low potential terminal of the resonant circuit. A variable resistor 19 is connected from the common terminal of the armatures to the terminal of the piezo-electric crystal remote from the tuned circuit. The field of the indicating meter is not shown. The armature coils rotate in field and are connected to the pointer or indicator 21.

In Fig. 2, the piezo-electric element 13 of Fig. 1 has been omitted and in its place a resonant circuit 23 has been substituted. This resonant circuit is composed of an inductor 25 and a capacitor 27. The ratio of the reactance of the inductance and the capacitance to their resistance has been made as large as possible. The resonant circuit is arranged within a compartment 29 which may be maintained at constant temperature to avoid undesirable variations in the characteristic of the circuit. It would be equally satisfactory to use circuit elements which are self compensating for variations of temperature.

Fig. 3 is similar to Fig. 1 but a pair of thermionic diode rectifiers 31—33 have been shown as substitutes for the rectifiers of Fig. 1. The cathodes of the thermionic tubes may be energized by any suitable current source, such as batteries or alternating current. Although diode rectifiers have been shown, it should be understood that triodes or other multi-electrode tubes may be used.

The method and theory of operation may be understood by reference to Fig. 1. The resonant circuit 1 is placed in the field of the generator. If the field is strong, it will not be necessary to resonate the circuit, as the inductor will pick up sufficient energy. The voltage induced in the inductor causes a rectified current to flow through the rectifier 7, resistor 8 and the armature winding 9. The piezo-electric element 13 is chosen so that the frequency of its normal mode of vibration will be slightly different from the assigned frequency to be maintained by the generator. By way of example, if the desired frequency is 750 kilocycles, the piezo-electric coupling element may be 750 kilocycles plus 100 cycles or 750 kilocycles minus 100 cycles. The reactance curve of the crystal is represented by the curves of Fig. 4. If the frequency of the induced voltage corresponds to "a" on the reactance curve, a rectified current will also flow through the rectifier 15 and the armature winding 17. The armatures and indicator 21 will assume a position which is determined by the resultant field of the two windings 9 and 17 and the main field which is now shown.

If the generator frequency shifts to correspond with "b" the current in the first rectifier circuit 7—9 will be unaltered, but the current in the second rectifier circuit 15—17 will increase, and the indicator will assume a new position corresponding to the new resulting field. If the induced voltage varies, the current in the rectifier circuits will vary but this variation will be proportional and will not effect the ratio of the two currents and the resulting field.

Thus, I have described a device which will indicate small changes in frequency but is independent of voltage changes. By way of example at 750 kilocycles, I have found a change of ±40 cycles will move the indicator from its midscale position to nearly its maximum deflection. In Fig. 2 the series resonant circuit must have a very high ratio of reactance to resistance to be effective. Since the piezo-electric element has the required characteristics, I prefer its use. The variable resistors 8 and 19 have been indicated in the several figures. The resistors may be used to adjust the relative resistances of the two rectifier circuits.

Although, I have described the preferred embodiments of my invention, I do not wish to be limited to the precise arrangement shown as numerous modifications within the scope of my invention will occur to those skilled in the art. I only limit my invention as required by the prior art and appended claims.

I claim:

1. In a frequency indicating device, means responsive to alternating currents whose frequency is to be indicated, means for converting said alternating currents to unidirectional currents, a second means for converting said alternating currents to unidirectional currents, means selectively responsive to a frequency slightly differing from the frequency of said alternating currents coupling said converting means and arranged as the sole current path between said converting means, and indicating means responsive to unidirectional currents supplied by said converting means.

2. In a frequency indicating device means responsive to radio frequency oscillations to be indicated, a rectifier connected to said means, a second rectifier, means responsive to radio currents of a frequency of the order of $\frac{1}{100}$ of one percent outside the range of said radio oscillation and arranged as the sole current path between said first and second rectifiers, and an indicating means responsive to currents rectified by said rectifiers.

3. In a frequency indicating device, means responsive to alternating currents of a desired frequency, means for converting said alternating currents to unidirectional currents, a second means for converting said alternating currents to unidirectional currents, a piezo-electric element responsive to a frequency slightly different from said desired frequency coupling said first and second current converting means and acting as the sole current path from said first mentioned means and said second current converting means, and current indicating means responsive to the vector sum of said unidirectional currents.

4. In a device of the character described, means responsive to radio currents of a predetermined frequency, means for rectifying said radio frequency currents, a second means for rectifying said radio frequency currents, a piezo-electric element having a frequency of vibration of the order of $\frac{1}{100}$ of one percent outside the range of said predetermined frequency coupling said rectifying means and arranged as the only current path between said rectifying means, and current indicating means connected to said rectifier means for indicating the vector sum of currents rectified by said rectifying means.

5. In a device of the character described, means responsive to radio currents of a predetermined frequency, means for rectifying said radio frequency currents, a second means for rectifying said radio frequency currents, a piezo electric element having a frequency of vibration slightly less than said predetermined frequency coupling said rectifying means and arranged as the sole current path between said rectifying means, and current indicating means connected to said rectifier means for indicating the vector sum of currents rectified by said rectifying means.

6. In a device of the character described, means responsive to radio currents of a predetermined frequency, means for rectifying said radio frequency currents, a second means for rectifying said radio frequency currents, a piezo-electric element having a frequency of vibration slightly greater than said predetermined frequency coupling said rectifying means and being the only current path between said rectifying means, and current indicating means connected to said rectifier means for indicating the deviation in frequency from the predetermined frequency.

7. In a device of the character described, means responsive to radio currents of a predetermined frequency, means for rectifying said radio frequency currents, a second means for rectifying said radio frequency currents, a piezo electric element having a frequency of vibration slightly less than said predetermined frequency and arranged as the sole current path between said rectifying means, and current indicating means connected to said rectifier means for indicating the deviation in frequency from the predetermined frequency.

HENRY D. OAKLEY.